US012323458B2

(12) United States Patent
Vesnovaty et al.

(10) Patent No.: US 12,323,458 B2
(45) Date of Patent: *Jun. 3, 2025

(54) THWARTING SYN FLOOD DDOS ATTACKS

(71) Applicant: MELLANOX TECHNOLOGIES, LTD., Yokneam (IL)

(72) Inventors: Andrei Vesnovaty, Petah Tikva (IL); Alexander Vesker, Kiryat Bialik (IL); Muhammad Sammar, Tamra (IL)

(73) Assignee: Mellanox Technologies, LTD., Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/412,134

(22) Filed: Jan. 12, 2024

(65) Prior Publication Data
US 2024/0154999 A1    May 9, 2024

Related U.S. Application Data

(63) Continuation of application No. 17/398,708, filed on Aug. 10, 2021, now Pat. No. 11,909,762.

(51) Int. Cl.
*H04L 9/40* (2022.01)
*H04L 7/00* (2006.01)
*H04L 69/326* (2022.01)

(52) U.S. Cl.
CPC ........ *H04L 63/1458* (2013.01); *H04L 7/0008* (2013.01); *H04L 69/326* (2013.01)

(58) Field of Classification Search
CPC ... H04L 63/1458; H04L 63/045; H04L 63/08; H04L 63/0823; H04L 63/12; H04L 9/3263; H04L 9/3268; H04L 9/40; H04L 69/326; H04L 7/0008; H04W 12/0431; H04W 12/069

(Continued)

(56) References Cited

U.S. PATENT DOCUMENTS 6,249,519 B1 * 6/2001 Rangachar .......... H04L 63/0245
370/230
6,938,097 B1 * 8/2005 Vincent ................... H04L 47/50
709/224

(Continued)

OTHER PUBLICATIONS

Sebastiano Miano "Introducing SmartNICs in Server-Based Data Plane Processing: The DDoS Mitigation Use Case" Date of publication Aug. 6, 2019, date of current version Aug. 19, 2019. IEEE.*

(Continued)

*Primary Examiner* — Samson B Lemma
(74) *Attorney, Agent, or Firm* — Sheridan Ross P.C.

(57) ABSTRACT

A system for efficiently thwarting syn flood DDoS attacks on a target server including a CPU, the system comprising: network controller hardware having steering capability; and a software application to create and to configure initial steering object/s which define a steering configuration of the network controller and monitor at least one opened connection to the server, including updating the steering configuration responsive to establishment of at least one connection to the server, wherein the network controller hardware's steering capability is used to provide a SYN cookie value used for said thwarting, and to send at least one packet, modified, to the packet's source.

17 Claims, 2 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,203,192 | B2* | 4/2007 | Desai | H04L 49/30 |
| | | | | 370/428 |
| 9,246,940 | B2* | 1/2016 | Khanal | H04L 63/1466 |
| 9,497,281 | B2* | 11/2016 | Jagadish | H04L 45/7453 |
| 9,628,509 | B2* | 4/2017 | Holloway | H04L 63/1458 |
| 9,838,425 | B2* | 12/2017 | Jalan | H04L 63/1458 |
| 10,091,237 | B2* | 10/2018 | Jalan | H04L 63/1466 |
| 10,574,691 | B2* | 2/2020 | Shapira | H04L 63/1458 |
| 10,581,907 | B2* | 3/2020 | Jalan | H04L 63/1466 |
| 10,637,828 | B2* | 4/2020 | Kahalon | H04L 47/20 |
| 11,909,762 | B2 | 2/2024 | Vesnovaty et al. | |
| 2011/0154488 | A1* | 6/2011 | Rajan | H04L 63/168 |
| | | | | 726/22 |
| 2014/0161136 | A1* | 6/2014 | Desai | H04L 49/254 |
| | | | | 370/419 |
| 2014/0301388 | A1* | 10/2014 | Jagadish | H04L 67/563 |
| | | | | 370/389 |
| 2014/0304810 | A1* | 10/2014 | Khanal | H04L 63/1466 |
| | | | | 726/22 |
| 2014/0325588 | A1* | 10/2014 | Jalan | H04L 63/1466 |
| | | | | 726/1 |
| 2016/0089641 | A1* | 3/2016 | Enomura | B01F 27/2712 |
| | | | | 366/279 |
| 2018/0054459 | A1* | 2/2018 | Jalan | H04L 63/1458 |
| 2018/0367567 | A1* | 12/2018 | Jalan | H04L 63/1466 |
| 2019/0089641 | A1* | 3/2019 | Shattah | H04L 63/1466 |
| 2019/0089679 | A1* | 3/2019 | Kahalon | H04L 47/20 |
| 2021/0377222 | A1* | 12/2021 | Sharma | H04L 63/0823 |
| 2022/0158979 | A1* | 5/2022 | Shribman | H04L 63/0272 |
| 2023/0016035 | A1* | 1/2023 | Mykytianskyi | H04L 63/1458 |

OTHER PUBLICATIONS

"DDoS Detection," Kentik, updated Jul. 30, 2021, 6 pages [retrieved online from: www.kentik.com/kentipedia/ddos-detection/].

"NVIDIA Bluefield-2 DPU Data Center Infrastructure on a Chip," NVIDIA Corporation, Apr. 2021, Datasheet, 2 pages[retrieved online from: www.nvidia.com/content/dam/en-zz/Solutions/Data-Center/documents/datasheet-nvidia-bluefield-2-dpu.pdf].

Brouer "DDoS protection Using Netfilter/iptables," Red Hat, Feb. 2014, 38 pages [retrieved online from: people.netfilter.org/hawk/presentations/devconf2014/iptables-ddos-mitigation_JesperBrouer.pdf].

Cole "SYN cookies ate my dog—breaking TCP on Linx," Kognitio Ltd, Feb. 23, 2018, 15 pages [retrieved online from: kognitio.com/blog/syn-cookies-ate-my-dog-breaking-tcp-on-linux].

Deierling "What Is a SmartNIC," Mellanox, Aug. 30, 2018, 9 pages [retrieved online from: blog.mellanox.com/2018/08/defining-smartnic].

Eddy et al. "TCP SYN Flooding Attacks and Common Mitigations," The IETF Trust, 2007, RFC 4987, 19 pages.

Fruhlinger "DDoS explained: How distributed denial of service attacks are evolving," IDG Communications, Inc., Feb. 12, 2021, pages [retrieved online from: www.csoonline.com/article/3222095/ddos-explained-how-denial-of-service-attacks-are-evolving.html].

Kam "Introducing Hairpin Offload," Nov. 2019, 29 pages [retrieved online from: dpdkna2019.sched.com/event/WYBz/hairpin-offloading-load-balancer-and-gateway-applications-ori-kam-mellanox].

Marsh "DDoS monitoring: how to know you're under attack," SolarWinds Worldwide, LLC, Jan. 25, 2017, 10 pages [retrieved online from: www.loggly.com/blog/ddos-monitoring-how-to-know-youre-under-attack/].

Zhang et al. "Poseidon: Mitigating Volumetric DDoS Attacks with Programmable Switches," Network and Distributed Systems Security (NDSS) Symposium 2020, 18 pages.

Notice of Allowance for U.S. Appl. No. 17/398,708, dated Oct. 12, 2023 18 pages.

* cited by examiner

THWARTING SYN FLOOD DDOS ATTACKS

CROSS REFERENCE TO RELATED APPLICATIONS

The present application is a continuation of U.S. patent application Ser. No. 17/398,708, filed on Aug. 10, 2021, the entire disclosure of which is hereby incorporated herein by reference, in its entirety, for all that it teaches and for all purposes.

FIELD

This invention relates generally to hardware devices, and more specifically to networked hardware devices.

BACKGROUND

Anti-DDoS (Distributed Denial of Service) solutions are provided, today, by Radware, Imperva, Akamai Technologies, Cloudflare, Google, Microsoft, Amazon Web Services, and many more.

DDoS attacks are described online e.g. at the following https www location: csoonline.com/article/3222095/ddos-explained-how-denial-of-service-attacks-are evolving.html#:~:text=The%20size%20of%020a%20volume, infrastructures%20and%20infrastructure%20manage ment%20tools.&text=The%20size%20of%20application% 2Dlayer,requests%20per%20second%20(RPS).

Typically, DDoS attacks use overwhelming (to the target server) amounts of bogus traffic. DDoS attacks include ICMP attacks, UDP attacks and spoofed-packet flood attacks. The size of an DDoS attack may be defined, depending on the type of attack, in either bits per second, packets per second, or requests per second. For example, specifically, the size of a volume-based attack is measured in bits per second (bps). Protocol DDoS attacks, aka network-layer DDoS attacks, send overwhelming numbers of packets to targeted network infrastructures and infrastructure management tools. Protocol attacks include, for example, SYN floods and Smurf DDoS, whose sizes may be measured in packets per second (PPS). Application-layer attacks involve flooding applications with malicious requests, and their size is thus measured in requests per second (RPS).

SYN flood attacks are described in the following online link: datatracker.ietf.org/doc/html/rfc4987. In these DDoS attacks, typically, an attacker bot deliberately does not send a SYN-ACK message back to the target. Instead, the target's server wastes its resources waiting for half-opened connections that never open, for lack of a returning a SYN-ACK message.

It is appreciated that normally, a client seeking to establish or open a connection, using the TCP protocol, to a server, requests a connection by sending a so-called SYN (synchronize) message to the server. The server acknowledges this, by sending a so-called SYN-ACK back to the client, who then, if legitimate, then sends the server an ACK, at which point the connection has been successfully established or opened according to the so-called TCP three-way handshake process.

In SYN flood attacks, the attacker deliberately fails to return the expected ACK code. Either the attacker aka malicious client simply does not send the expected ACK at all, or the attacker spoofs the source IP address in the SYN, which causes the server to send its SYN-ACK to the wrong IP address, which then does not send an ACK, since that IP address never sent a SYN, hence is not expecting the ACK. This results in numerous half-open connections which bind or tie up server resources and eventually exceed server resources available, at which point the server is unable to connect to its legitimate clients. Known countermeasures include so-called "SYN cookies" as described elsewhere herein.

DDoS detection is known e.g. as described at the following https www location: kentik.com/kentipedia/ddosdetection/#:~:text=There%20are%20two%20primary%20means, premises%20or%20via%20cloud%20services as well as in the following https www source: loggly.com/blog/ddos-monitoring-how-to-know-youre-under-attack/.

Data Plane Development Kit (DPDK), an Open Source project by the Linux Foundation (or libibverbs), or TC (Traffic Control) in kernel, may be used to develop anti-DDoS applications e.g. to provide a programming framework for processors such as x86, ARM, or PowerPC. The DPDK provides libraries for specific hardware/software environments by creating an Environment Abstraction Layer (EAL). This hides hardware/software environment specifics (as in libibverbs, which is a library which enables user-space processes to use Remote Direct Memory Access (RDMA) verbs), providing a standard programming interface to libraries, available hardware accelerators, and other hardware and operating system (Linux, FreeBSD) elements.

Thus the DPDK provides the data plane libraries and network interface controller polling-mode with drivers which facilitate offloading TCP packet processing from the operating system kernel to processes running in user space. This offloading enhances computing efficiency and achieves higher packet throughput than would be possible if interrupt-driven processing provided in the kernel were to be used. DPDK is commonly used inter alia because it simplifies development of high speed data packet networking applications e.g. by scaling from mobile to server-grade processors. DPDK supports instruction set architectures such as Intel, IBM POWER8, EZchip, and ARM which may be used in a particular use-case.

Other solutions include user space TCP stack implementation over DPDK or kernel space packet manipulation using hooks like XDP incorporated with TC (Traffic Control).

Smart NICs may have packet "steering" functionality, which may direct packets, e.g. to enable the NIC to move packets, within a server, to or from interfaces and virtual NIC buffers which can then be mapped to, say, applications, or to virtual machines, or to containers. Efficiently steering packets, as an offload method, may significantly reduce host CPU overhead. Many conventional steering technologies are known, examples of which are described in the Background section, and may be utilized herein to implement steering.

A "hairpin" is a known feature, e.g. as is apparent in the following https link: dpdkna2019. sched.com/event/WYBz/ hairpin-offloading-load-balancer-and-gateway-applications-ori-kam-mellanox. Typically, a hairpin is an RX/TX queue that is used by a NIC in order to offload wire to wire traffic. Each hairpin queue may be bound to queue/s from other type/s.

BF2 is a known DPU whose datasheet is available online e.g. at the following https www location: nvidia.com/content/dam/en-zz/Solutions/Data-Center/documents/ datasheet-nvidia-bluefield-2-dpu.pdf.

The NVIDIA® DOCA™ software framework enables developers to rapidly create applications and services for the BlueField®-2 DPU. NVIDIA® DOCA™ facilitates leveraging DPU hardware accelerators, providing enhanced data center performance, efficiency, and security.

A MAC address, aka media access control address, is a unique identifier assigned to a network interface controller (NIC), and may then be used as a network address—e.g. when communicating within a given network segment.

A 5-tuple includes the 5 values (source IP address, source port number, destination IP address, destination port number, and finally the protocol in use e.g. TCP/UDP/SCTP/ICMP) which together define a bidirectional network connection between two or more remote and local machines e.g. Transmission Control Protocol/Internet Protocol (TCP/IP) connection. The source address is the IP address of the network to create and send a data packet over the network, and the destination address is the recipient of the packet.

Infrastructure distributed denial of service (DDoS) protection is described in U.S. patent Ser. No. 10/574,691 to Shapira et al.

U.S. Pat. No. 9,628,509 assigned to Cloudflare Inc. describes a method for identifying a Denial-of-service Attack in a cloud-based proxy service.

State of the art references describing DDoS and SYN cookies include the following https links: kognitio.com/blog/syn-cookies-ate-my-dog-breaking-tcp-on-linux/ and people.netfilter.org/hawk/presentations/devconf2014/iptables-ddos-mitigation_JesperBrouer.pdf.

"Steering" e.g. of network packets, is a known functionality. For example, one or more network interfaces may steer an incoming network packet within the network routing/switching device to an appropriate processing resource from among plural processing resources provided by a network routing/switching device. A network interface steering table data structure may reside on a computer readable medium e.g. within the network routing/switching device and may store interface identifiers respectively corresponding to network interfaces of the network routing/switching device.

Network packet steering, e.g. from a network interface module to a processing resource, is described in U.S. Pat. No. 7,203,192 among other publications. In such steering, a steering table, which may be dynamically configurable, is stored within memory of each or various network interface/s of a networking routing/switching device. The steering table may represent a mapping that logically assigns various network interfaces to one of plural packet processing resources of a network routing/switching device. The steering table may store a unique identifier/address of an assigned packet processing resource. Responsive to receiving a packet on a network interface, the network interface may perform Layer 1 or Layer 2 steering of a received packet to its assigned packet processing resource by retrieving the identifier/address of the assigned packet processing resource from the steering table e.g. based on a channel identifier associated with the received packet. the received packet may be processed by the assigned packet processing resource.

Steering network packets may be implemented within a high-density server or blade server having netmods and/or switching fabric, and/or processing resources. A unique identifier may be received by a processing resource and may be used to distinguish that processing resource from others. That processing resource may be used to perform operation/s (e.g. route, forward, authenticate, encrypt, decrypt) against a network packet. the unique identifier may be received from a GUI application interfaced with the processing resource. The unique identifier may be modifiable and/or configurable by the GUI application. any software application, including command line interfaces, may be used to provide a processing resource with a unique identifier.

A mapping which may be received by the processing resource may logically associate the unique identifier of the processing resource with a netmod or with component/s thereof. the components may represent line interface ports embodied in the netmod which receives/transmits network packets from/to other computing devices. The mapping may be received from the GUI application. the mapping may be represented as a table data structure (e.g., steering table) in memory of the processing resource. The mapping may include an identifier/address of the processing resource and/or an identifier for the netmod, and/or identifier/s for line interface ports and/or sub-interfaces included on the netmod, and/or a pointer to a specific process that may reside on the processing resource and may be used to process steered network packets. the GUI application may publish, to end-users, processing and/or memory capabilities of the processing resource, to allow an end-user to create and/or alter a mapping e.g. to suit that end-user's network traffic patterns.

U.S. Pat. No. 6,938,097 to Vincent et al describes a system for early packet steering buffer support. U.S. Pat. No. 6,249,519 to Rangacher et al describes flow based circuit steering in ATM networks. U.S. Patent Application Publication 2014/0161136A1 to Desai et al describes network packet steering via configurable association of packet processing resources and network interfaces.

SUMMARY OF THE DISCLOSURE

The following acronyms and abbreviations are used herein:
ARM—Advanced RISC Machines
CRC—cyclic redundancy check
DDos—Distributed Denial of Service
DPDK—Data Plane Development Kit
DPU—Data Processing Unit
EAL—Environment Abstraction Layer
ICMP—Internet Control Message Protocol
IP—Internet Protocol
MAC—Media Access Control
NIC—Network Interface Card
PPS—Packets Per Second
RDMA—Remote Direct Memory Access
RISC—Reduced Instruction Set Computing
RPS—Receive Packet Steering
RX—Receive or Receiver
SYN, SYN-ACK—follows TCP 3-way handshake terminology
TC—Traffic Control
TCP—Transmission Control Protocol
TX—Transmit or Transmitter
UDP—User Datagram Protocol Certain embodiments seek to provide a system and method providing security to servers, the method comprising thwarting SYN flood attacks on target server/s including using steering capability, rather than computations by the target server's CPU in real time, to provide a hash function for at least one packet. The packet may comprise a TCP packet and may be a SYN packet or an ACK packet. For example, in a TCP "handshake", as defined e.g. in the CP protocol RFC, a web client sends a Packet flagged with SYN to a web server which sends back a packet flagged with both SYN & ACK back. Then, the web client normally sends a packet flagged with ACK to the web server. The initial sequence number selected by the web client is typically set in the SYN flag. The initial sequence number selected by the web server is typically in the SYN/ACK flag. The server acknowledgement of the client's sequence number includes incrementing the client's sequence number, which yields the "acknowledgement number". The sequence and acknowledgment numbers allow missing or out-of-order segments to be detected by both server and client.

Certain embodiments seek to thwart a DDoS attack by a botnet, by DDoS'ing the botnet, such that the botnet's DDoS attack on the server is no longer cost effective from the botnet's viewpoint.

IP address spoofing, aka IP spoofing, involves impersonating another computing system by generating Internet Protocol (IP) packets with a false source IP address. SYN cookies, typically each comprising specific choices of initial TCP sequence numbers by TCP servers, may be used to thwart (e.g. resist, defeat, defend against) IP address spoofing attacks.

SYN cookies as a technique is described e.g. in the following https link: datatracker.ietf.org/doc/html/rfc4987 #section-3.6.

SYN cookies allow a server to avoid dropping connections when the SYN queue fills up [AV8]. Instead of storing additional connections, the SYN queue entry is encoded into the sequence number sent in the SYNACK response. If the server subsequently gets an ACK response from the client with the incremented sequence number, the server can then reconstruct the SYN queue entry using information encoded in the TCP sequence number, and then proceed as usual with the connection. Thus SYN cookies are initial TCP sequence numbers that are constructed according to certain rules. When a client sends back a TCP ACK packet to the server in response to the server's SYN+ACK packet, the server extracts the SYN cookie sent to the client then determines whether this is, indeed, a valid SYN cookie.

The SYN Cookie implementation provided by TCP stacks, such as but not limited to Linux kernel, has anti-DDoS functionality which requires crypto hash calculation per TCP SYN & ACK packets, hence expends considerable per packet target server CPU effort. Certain embodiments seek to thwart a DDoS attack efficiently, given these circumstances, e.g. by hardware offloading to ease the load on host or target CPUs.[AV9].

At least the following embodiments are included in the scope of the present invention:

Embodiment 1. A system for efficiently thwarting syn flood DDoS attacks on a target server including a CPU, the system comprising: network controller hardware having steering capability; and/or a software application to create and/or to configure initial steering object/s which may define a steering configuration of the network controller and may monitor at least one opened connection to the server, typically including updating the steering configuration responsive to establishment of at least one connection to the server. Typically, the network controller hardware's steering capability is used to provide a SYN cookie value used for the thwarting, and/or to send at least one packet, modified, to the packet's source.

Embodiment 2. A system according to any preceding embodiment/s wherein the initial steering object/s comprise at least one pre-configured, periodically updated steering table/s and wherein the software application creates and configures the initial steering object/s by including, in the steering table, at least one SYN cookie value which is computed by the network controller hardware's steering capability, and which is used by at least one SYN packet to generate SYNACK.

Embodiment 3. A system according to any preceding embodiment/s wherein the initial steering object/s comprises at least one pre-configured, periodically updated steering table/s, and wherein the software application creates and/or configures the initial steering object/s by including, e.g. in the steering table, at least one SYN cookie value which is computed by the network controller hardware's steering capability and which is used by at least one ACK packet having sequence match predefined values, to validate the ACK packet's sequence match predefined values and to generate SYNACK.

Embodiment 4. A system according to any preceding embodiment/s wherein the software application's creation and configuration of the initial steering object/s includes the following operations:
for TCP SYN/ACK packets, creating steering objects to look up a value over packet headers; and/or
for at least one packet having a header, creating steering objects to reverse the packet's header and to send the packet back to the packet's source; and/or
waiting for, and tracking, all incoming new connections; and/or
waiting for, and tracking, all stalled or closed connections; and/or
at least once, refreshing a created steering object to ensure randomness; and/or
configuring at least one steering object/s for allowed established connections.

Embodiment 5. A system according to any preceding embodiment/s wherein at least one final ACK establishment packet is verified using the network controller processor, thereby to perform SYN cookie verification without wasting target server CPU cycles, by using only hardware without software calculation.

Embodiment 6. A system according to any preceding embodiment/s wherein the network controller processor uses the steering capability to map a hash over a field.

Embodiment 7. A system according to any preceding embodiment/s wherein the network controller hardware uses the steering capability to compute a CRC32 hash over a IP 5tuple field.

Embodiment 8. A system according to any preceding embodiment/s wherein the network controller hardware uses the steering capability for redirecting at least one packet to a different location by modifying the at least one packet.

Embodiment 9. A system according to any preceding embodiment/s wherein the modifying comprises swapping the packet's source and destination addresses.

Embodiment 10. A system according to any preceding embodiment/s wherein the network controller hardware uses the steering capability to filter at least one packet over at least one specific packet field.

Embodiment 11. A system according to any preceding embodiment/s wherein the network controller processor uses the steering capability to filter at least one packet having a TCP sequence number which matches at least one specific TCP sequence number.

Embodiment 12. A system according to any preceding embodiment/s wherein the connections comprise TCP connections, wherein at least one packet has a header which comprises a 5tuple TCP header and wherein the SYN and ACK packets comprise TCP SYN and ACK packets.

Embodiment 13. A system according to any preceding embodiment/s wherein the network controller hardware handles at least one packet arriving via port P as follows:
Looks up a hash over a received SYN 5tuple TCP header; and/or
Sets the packet's TCP sequence to a stored value found in a SYN Cookie lookup which looks up the SYN cookie value; and/or
Reverses the packet's source and destination fields; and/or
Sends a SYN ACK packet over the same port P; and/or Verifies a TCP SYN ACK packet and passes the TCP SYN ACK packet to the software application.

Embodiment 14. A system according to any preceding embodiment/s wherein the network controller hardware comprises a SmartNIC.

Embodiment 15. A system according to any preceding embodiment/s wherein the software application is deployed at user level.

Embodiment 16. A system according to any preceding embodiment/s wherein the software application is deployed at kernel level.

Embodiment 17. A system according to any preceding embodiment/s which is incorporated as an anti-DDoS solution in a server.

Embodiment 18. A system according to any preceding embodiment/s which is incorporated as a library/component in an SDK.

Embodiment 19. A method for efficiently thwarting syn flood DDoS attacks, the method comprising: providing, in a network controller, hardware having packet steering capability; and/or providing a software application to create and to configure initial steering object/s which define a packet steering configuration of the network controller and monitor all opened connections, including updating the packet steering configuration each time a connection is established; and/or thwarting SYN flood DDoS attacks by computing a SYN cookie value used for the thwarting, without wasting target server CPU cycles on crypto hash calculation per SYN and ACK packets in real time, thus without devoting per-packet target server CPU effort thereto in real time, including using the steering capability to provide the SYN cookie value, and to at least one packet to the packet's source, rather than resorting to software to perform crypto hash calculation per SYN and ACK packets in real time.

DETAILED DESCRIPTION OF CERTAIN EMBODIMENTS

Figure 1:
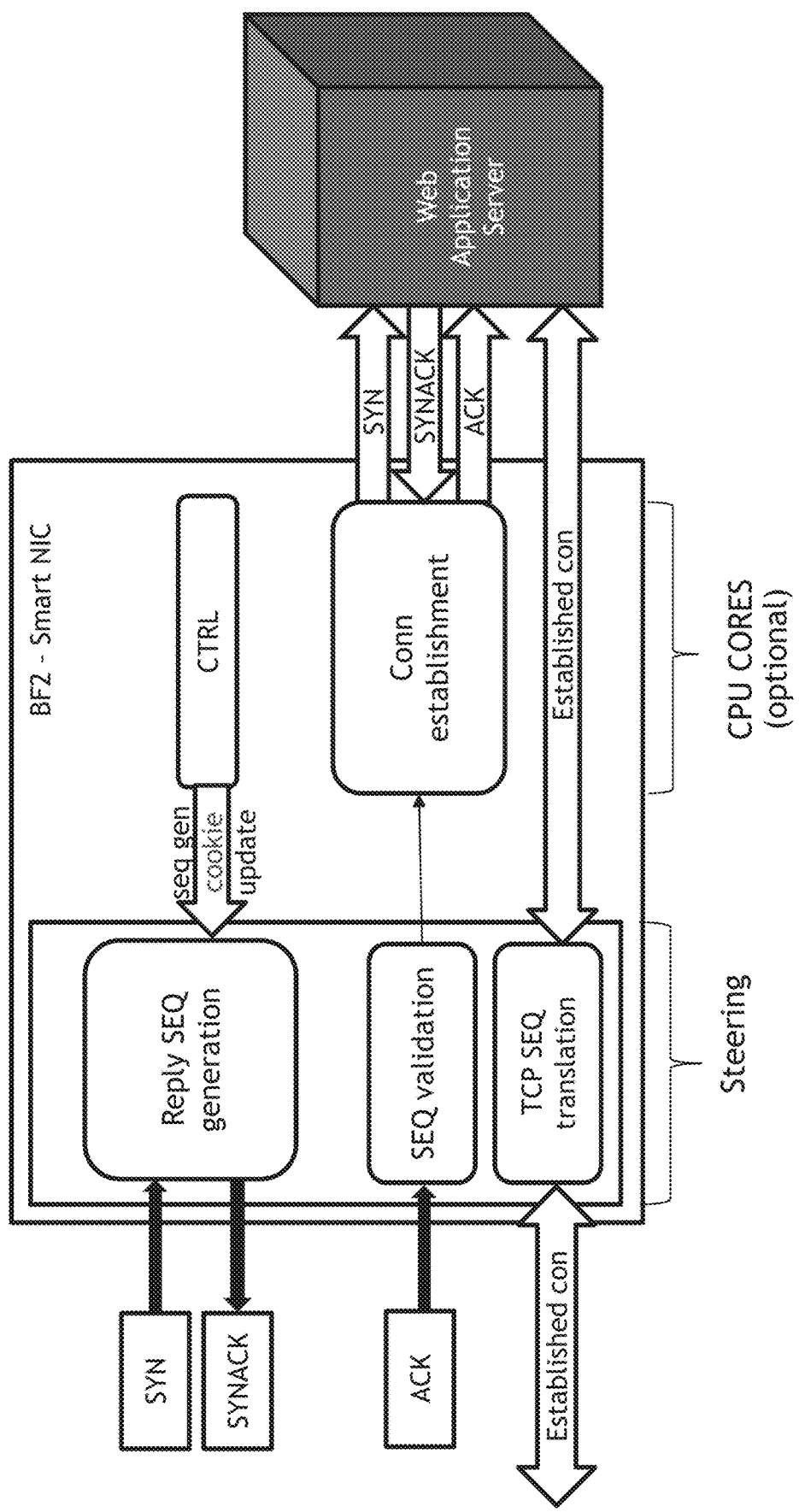
FIGS. 1 and 2 are simplified block diagram illustrations of respective first and second embodiments of the present invention. It is appreciated that blocks from the first embodiment, or any subset thereof including the empty subset, may be combined with blocks from the second embodiment, or any subset thereof, including the empty subset.

In denial-of-service (DoS) attacks, an attacker seeks to make a machine or network resource, such as a web server, unavailable to its intended users e.g. web clients, typically by flooding the targeted server (or more generally, machine or resource) with requests designed to overload the system. In distributed denial-of-service (DDoS) attacks, the traffic flooding the target the victim originates from many sources, rather than from a single source.

Botnets are sometimes harnessed for Distributed Denial-of-Service (DDoS) attacks so as to bombard a target server with requests by the bots, thus overloading the server.

The overloaded Internet computer or service which becomes unresponsive, is known as the "target" of the DDoS attack.

A system for efficiently thwarting syn flood DDoS attacks against a target is now described with reference to FIGS. 1 and 2.

The system typically includes a SmartNIC or other hardware having steering capability and a SW (software) application, which, typically, create and/or configure initial steering objects which define a steering configuration of the SmartNIC, and/or monitors all opened connections (e.g. of end-users or web clients to a target server), including updating the steering configuration each time a connection (e.g. between end-users or clients to a target server)—after successful handshake—is established or opened; and thwarting SYN flood DDoS attacks by computing a SYN cookie value, without wasting CPU cycles in the target server on crypto hash calculation per SYN and ACK packets in real time, thus without devoting per-packet target server CPU effort thereto in real time, including using the SmartNIC hardware's steering capability to provide the SYN cookie value and to modify the packet and then send back to the packet's source, rather than resorting to software to perform crypto hash calculation per SYN and ACK packets in real time.

The SmartNIC may for example comprise a Nvidia® Mellanox® ConnectX® SmartNIC or any other network interface card with steering capabilities suitable for the embodiments described herein.

It is appreciated that the SYN cookie value, which is typically used for setting and verifying the cookie, may be unique, but need not necessarily be unique. For example, each packet may be mapped to a value whose computation typically depends on the 5-tuple aka 5tuple. Each time different packets are mapped to the same value, this may be termed a "collision". The SYN cookie value, even if not unique, is, however, typically consistent (e.g. each given packet is always mapped to the same value).

Thus the steering capability of the SmartNIC typically yields a system ability to compute a hash over suitable fields (e.g. CRC32 over the IPv4 (say, or IPv6) 5tuple aka IPv4 5-tuple). It is appreciated that CRC32 is not the only method that may be used to compute a 5-tuple hash; other hardware implemented hash functions may be used, for example. The protocol also need not be limited to IPv4 (or IPv6).

The steering capability of the SmartNIC also typically yields a system ability for modifying and/or redirecting a packet to suitable locations e.g. in order to swap between source and destination addresses and ports. The steering capability of the SmartNIC also typically yields a system ability to filter packet over specific packet fields (e.g. match specific TCP sequence number/s). The steering capability of the SmartNIC also typically yields a system ability to compute a SYN cookie value and, typically, to modify and then send at least one packet to the source, using only HW without software calculation. Typically, the hardware also verifies the final ACK establishment packet.

The SW (software) application, typically in the user or kernel level (of the Linux, or of the SmartNIC e.g.), may create and/or configure an initial steering object, and/or may keep track of opened connections. Once a connection has opened, or has been established, its status may be monitored by the software application, and the steering configuration is updated accordingly.

A particular advantage of certain embodiments is that the Smart NIC HW is responsible for computing and/or verifying the SYN cookies' values—which saves on target server CPU cycles that may otherwise be required.

Preparation stage: on Smart NIC HW, configure steering table mapping TCP packets (typically, but not limited, by 5-tuple) to 32 bit value used as a SYN cookie (e.g. TCP sequence number or SEQ, for example set SEQ=SEQ_KEY_1, . . . SEQ=SEQ_KEY_N. It is appreciated that two different TCP SYN packets may map to the same SYN cookie value.

When a TCP packet is received, the Smart NIC HW typically performs all or any subset of the following operations, suitably ordered e.g. as follows:

For packets flagged with SYN:
(1) Look up a SYN cookie value, or a value derived therefrom, for received packet in the steering table configured during preparation stage aka "preparation phase".
(2) Reverse the packet's source aka SRC MAC, IP & port fields and destination aka DST MAC, IP & port field. Other IP/TCP fields may also be reversed and/or modified.
(3) Copy TCP sequence to the ACK sequence packet field.
(4) Set the TCP (say) sequence to the stored value found in the lookup (1) (SYN Cookie-Send the SYN ACK packet over the same Smart MC port as before e.g. the same port over which the packet was received.

For packets flagged with SYN&ACK (say SYNACK packets), the following operations may be performed:
(1) Look up for SYN cookie value, or a value derived therefrom, for received packet in the steering table configured during preparation stage.
(2) Compare TCP ACK sequence of the packet decremented by 1 with the SYN cookie value. If the values are not equal, the received TCP packet may be considered spoofed and is typically handled accordingly (e.g. may be accounted for statistics, and dropped). If the values are equal, the packet may be forwarded to software for connection establishment with the target TCP server. Typically, each established connection has at least one steering rule determining how the packet is to be forwarded to the target TCP server.

It is appreciated that, throughout, the embodiments herein are not necessarily TCP specific, since this method can be used, inter alia, for mitigation on higher level protocols involving sequences (not necessarily TCP sequences) and session keys. Also, packet matching/mapping to SYN cookie value is not limited to use of a 5-tuple, and may instead utilize some other subset of packet header fields. Use of CRC32 hash computation is also not intended to be limiting, since other hash computation capabilities available on the Smart NIC's hardware may be employed instead.

The SW configuration flow which may be performed by the software application may include all or any subset of the following operations, suitably ordered e.g. as follows:

Create steering object/s to look up at least one value e.g. as described above
Create steering object/s to reverse the packet header and send the packet back to its source
Wait for incoming new TCP connections and track any new TCP connections
Wait for stalled/closed TCP connections and track any stalled/closed TCP connections
Refresh created steering objects after some value—e.g. to ensure randomness
Configure steering objects for allowed established or opened connections.

It is appreciated that any suitable number of steering objects may be used, as long as the number of steering objects suffices to implement mapping of SYN and ACK TCP packets to SYN cookie values as described herein.

The system of FIG. 1 shows an example of an anti-DDoS solution in accordance with certain embodiments, which is implemented for a web server which is deployed in association with a smartNIC such as a BlueField® SmartNIC, e.g. the NVIDIA® BlueField®-2 data processing unit (DPU) aka BF2.

As is known in the art, BlueField® SmartNICs combine ARM processing power with advanced network offloads to accelerate security, networking and storage applications. Based on the BlueField® system-on-chip (SoC) programmable network engine, BlueField® SmartNICs integrate the Mellanox ConnectX®-5 network controller with ARM multicore processors, yielding a high-performance programmable platform.

It is appreciated that other SmartNICs having steering capability may be employed; such that BlueField® in general and BF2 in particular, are mentioned herein merely by way of example as one suitable implementation for providing an accelerated anti-DDoS solution. Similarly, the ConnectX®-5 network controller is but one possible network controller mentioned herein merely by way of example.

As shown, SYNs are received by the steering capability aka steering functionality in (e.g.) the BF2 which also typically receives cookies e.g. as described herein, and which, responsively, generates SYNACKS. It is appreciated that there is typically no resource allocation on malformed SYNs; these may be handled by static steering rules e.g. as described herein. Also, ACKs are received by the steering capability which, responsively, performs sequence validation which, if successful, leads to conn (aka connection) establishment. It is appreciated that there is typically a failure of validation for malformed acks which, responsively, are then dropped, rather than continuing to overload and starve the target server. Connection to the designated application is established only for requests which undergo a valid TCP handshake.

Typically, the number of steering rules handling malformed packets is static or predefined, rather than depending on the number of malformed packets; this is advantageous in preventing attack amplification. Each entry in the steering table is typically considered a rule. Steering may include adding an entry/rule to the table—which is termed "configuration", or a configuration effort, and matching the packet to an action, and then applying the action defined by the matched rule, which is termed "packet handling", or a packing handling effort.

What follows connection establishment or opening of a connection, is a SYN being sent to a server using TCP protocol, e.g. the web application server, which sends a SYNACK back, and, responsively, receives an ACK back. The Reply SEQ generation, SEQ validation, TCP sequence aka TCP SEQ translation, CTRL and Conn establishment (or opening a connection) may all be performed by existing ARM processor functionalities—or, alternatively, by other processors e.g. as described in detail herein, both in general, and with reference to FIG. 2. The cookie provided by the CTRL functionality to the Reply SEQ generation functionality is used for sequence generation updating.

Figure 2:
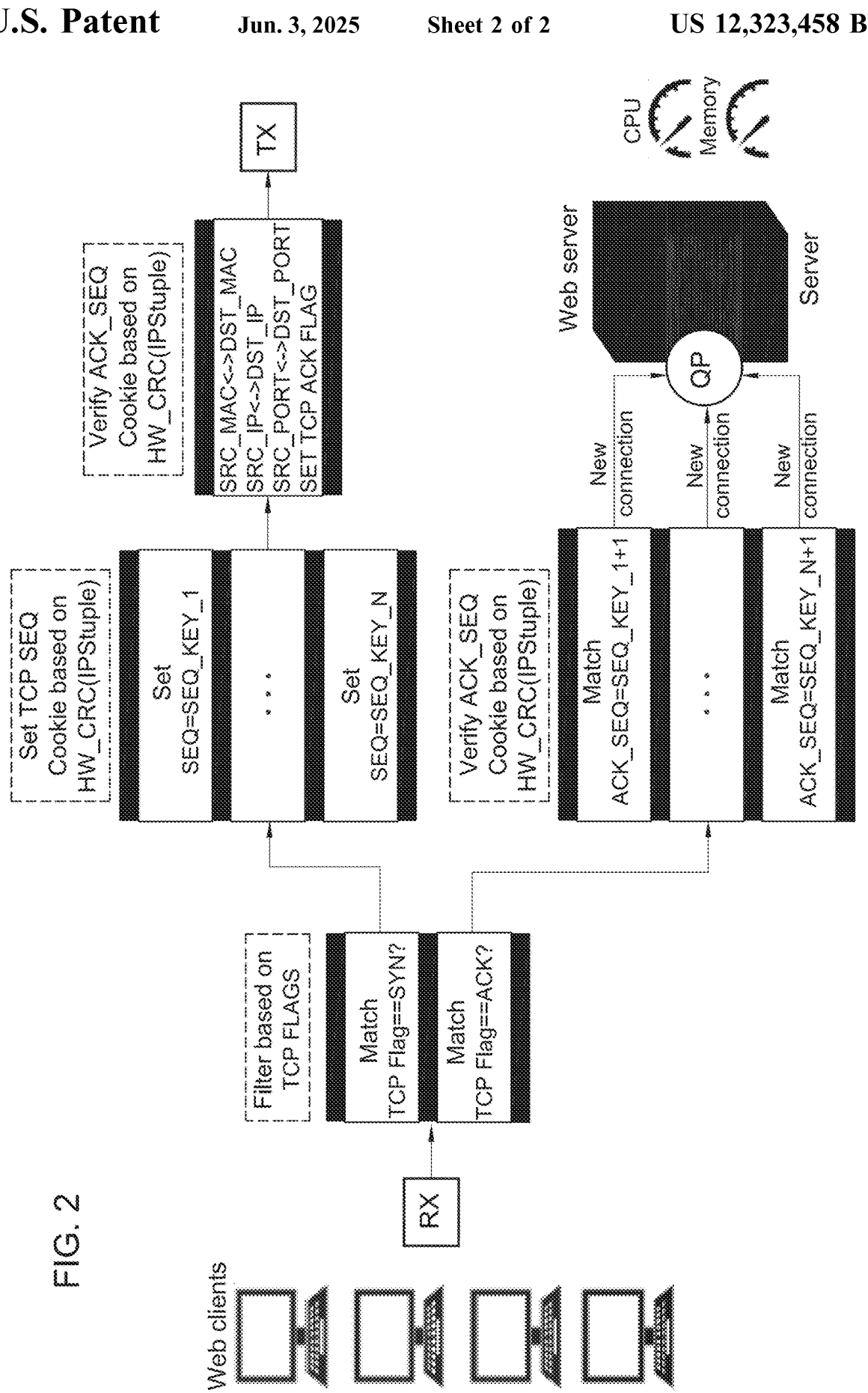

Referring now to FIG. 2, a target server is shown, one of many which may be targeted by a DDoS attack from time to time. The target server may, for example, be a web server providing web services such as searches or social networks, thus may be serving a multiplicity of web clients. As for the system of the present invention, both its RX functionality (packets received by the web server from its clients) and its TX functionality (packets sent back to web clients) are shown.

The system of the present invention, which is typically external to the web server e.g. in an NIC, may filter, e.g. based on TCP flags, and then, depending on whether there is a TCP Flag==SYN match (flag is SYN not ACK) or a TCP Flag==ACK match (flag is ACK), the system may either (in the former case) set a TCP SEQ Cookie based on HW_CRC (IP5tuple), or may verify an ACK_SEQ Cookie e.g. based on HW_CRC (IP5tuple) where cyclic redundancy check is abbreviated as CRC.

A 'hairpin" is a feature which is used to offload forwarding traffic from the wire back to the wire, while modifying the packet header. A packet may be sent to a hairpin, typically after the packets source and destination are swapped. In other words, as described above, according to the sequence of handling SYN packets, the system may swap SRC and DST (e.g. source and destination port, IP address and MAC) of the relevant packet, then set relevant flags and send to the hairpin. For example:

Source MAC (media access control address) aka SRC_MAC<->destination MAC aka DST_MAC Source IP address SRC_IP<->destination IP address DST IP Source port SRC_PORT<->destination port DST_PORT SET TCP ACK FLAG.

Typically, this feature performs all or any subset of the following operations, in any order e.g. as shown (typically, to short-circuit NIC input and output):

1. Receive packet from NIC input; and/or
2. Modify packet inside NIC, no host CPU involved/and/or
3. Send packet to output It is appreciated that QP is used herein to denote a queue pair or packets forwarded to server.

It is appreciated that typically, a pre-configured (and periodically updated) steering table/s is provided (after typically being pre-generated on host CPUs or on BF2 ARM CPUs, e.g. offline or before run-time, by suitable available hardware such as the BF2's ConnectX® processor).

Any suitable method may be described to generate and store the steering table. The values in the steering table may then be used for providing anti-DDoS functionality e.g. as described herein. The table may be updated from time to time, e.g. periodically.

According to certain embodiments, the steering tables that the target server is using, are replaced or updated periodically, or from time to time. This prevents attackers from slowly learning sequences, until they are able to reconstruct the entire steering table that a target server is using; replacing or updating the tables thwarts any such efforts by would-be attackers.

According to one embodiment, the steering tables are always uploaded (do not need to be specially uploaded upon onset of a DDoS attack), although this somewhat decreases the target server's capacity. Alternatively, the steering tables are uploaded only when a DDoS on the target server is detected. Any suitable DDoS detection technique may be employed. For example, indicators of an ongoing DDoS attack include all or any subset of the following:

An IP address makes at least x requests over y seconds
A server responds with a 503 warning, due to service outages
TTL (time to live) on a ping request times out
A connection is used for an organization's internal software, and the organization's users notice slowness of that connection.
Log analysis detects a traffic spike.

More generally, detecting DDoS attacks may include in-line examination of packets and/or out-of-band detection e.g. using traffic flow record analysis.

A particular advantage of certain embodiments is that rather than "using up" the target server's CPU, in real time, on computations serving the anti-DDoS functionality, the method makes good use of the fact that, in practice, a SmartNIC is often deployed with a target (e.g. DDoS-targeted) server. As described herein, according to an embodiment, a SmartNIC, in data communication with the target server, may be used to avoid expending target server CPU resources on real time computations, by pre-configuring (and typically updating, from time to time) steering tables, which can be uploaded into the NIC; these tables may store many, or all, or at least one of the hash values used by the anti-DDoS functionality, e.g. for computation of SYN cookie values, or for responses by the target server to packet/s sent by the attacker.

It is appreciated that any suitable matching may be used to perform verification. The following is a non-limiting example of verification: assume there is a TCP Flag==ACK match; the system may verify an ACK_SEQ Cookie e.g. based on HW_CRC (IP5tuple), by performing the following match operations (incrementations e.g. as described herein): match ACK_SEQ==SEQ_KEY_1+1, . . . math ACK_SEQ==SEQ_KEY_N+1, each of which is associated with a new connection (e.g. of a web client) to the web server, as shown.

Also, the term SmartNIC as used herein may include any Network Interface Card (i.e. PCIe card) that plugs into a server or storage box to enable connectivity to an Ethernet network. If DPU based, the SmartNIC, apart from providing connectivity, also implements network traffic processing on the NIC that would have had to be performed by the CPU in the case of a foundational NIC. It is appreciated that a DPU (Data Processing Unit) based SmartNIC may include ASIC/s and/or may include FPGA/s, and/or may include System/s-on-a-Chip (SOC).

SmartNIC technology is described at the following online location: blog.mellanox.com/2018/08/defining-smartnic/

The anti-DDoS system herein may be incorporated in, say, a server such as, for example, a cloud gaming server or, e.g. as a library/component, in an SDK such as but not limited to NVIDIA® DOCA™.

It is appreciated that software components of the present invention may, if desired, be implemented in ROM (read only memory) form. The software components may, generally, be implemented in firmware or hardware, if desired, using conventional techniques. It is further appreciated that the software components may, according to certain embodiments, be instantiated, for example: as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention, which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather, the scope of the invention includes, inter alia, the appended claims and equivalents thereof.

The invention claimed is:

1. A system for efficiently thwarting syn flood DDOS attacks on a target server including a CPU, the system comprising:
   a. network controller hardware having a steering capability; and b. a software application to create and to configure initial steering object/s which define a steering configuration of the network controller and monitor at least one opened connection to the server, including updating the steering configuration responsive to establishment of at least one connection to the server, wherein the network controller hardware's steering capability is used to provide a SYN cookie value used for said thwarting, and to send at least one packet, modified, to the packet's source, wherein the network controller hardware uses said steering capability for redirecting said at least one packet to a different location by modifying said at least one packet, and wherein said modifying comprises swapping said at least one packet's source and destination addresses.

2. A system according to claim 1 wherein said initial steering object/s comprise at least one pre-configured, periodically updated steering table/s and wherein said software application creates and configures said initial steering object/s by including, in the steering table, at least one SYN cookie value which is computed by the network controller hardware's steering capability, and which is used by at least one SYN packet to generate SYNACK.

3. A system according to claim 1 wherein said initial steering object/s comprises at least one pre-configured, periodically updated steering table/s, and wherein said software application creates and configures said initial steering object/s by including, in the steering table, at least one SYN cookie value which is computed by the network controller hardware's steering capability and which is used by at least one ACK packet having sequence match predefined values, to validate the ACK packet's sequence match predefined values and to generate SYNACK.

4. A system according to claim 1 wherein the software application's creation and configuration of said initial steering object/s includes the following operations:
for TCP SYN/ACK packets, creating steering objects to look up a value over packet headers;
for at least one packet having a header, creating steering objects to reverse the packet's header and to send the packet back to the packet's source;
waiting for, and tracking, all incoming new connections;
waiting for, and tracking, all stalled or closed connections;
at least once, refreshing a created steering object to ensure randomness;
configuring at least one steering object/s for allowed established connections.

5. A system according to claim 1 wherein at least one final ACK establishment packet is verified using a processor of the network controller, thereby to perform SYN cookie verification without wasting target server CPU cycles, by using only hardware without software calculation.

6. A system according to claim 1 wherein a processor of the network controller uses said steering capability to map a hash over a field.

7. A system according to claim 6 wherein the network controller hardware uses said steering capability to compute a CRC32 hash over a IP 5tuple field.

8. A system according to claim 1 wherein the network controller hardware uses said steering capability to filter at least one packet over at least one specific packet field.

9. A system according to claim 8 wherein a processor of the network controller uses said steering capability to filter at least one packet having a TCP sequence number which matches at least one specific TCP sequence number.

10. A system according to claim 1 wherein said connections comprise TCP connections, wherein at least one packet has a header which comprises a 5tuple TCP header and wherein said SYN and ACK packets comprise TCP SYN and ACK packets.

11. A system according to claim 10 wherein the network controller hardware handles at least one packet arriving via port P as follows:
Looks up a hash over a received SYN 5tuple TCP header;
Sets the packet's TCP sequence to a stored value found in a SYN Cookie lookup which looks up said SYN cookie value;
Reverses the packet's source and destination fields;
Sends a SYN ACK packet over the same port P;
Verifies a TCP SYN ACK packet and passes the TCP SYN ACK packet to the software application.

12. A system according to claim 1 wherein the network controller hardware comprises a SmartNIC.

13. A system according to claim 1 wherein said software application is deployed at user level.

14. A system according to claim 1 wherein said software application is deployed at kernel level.

15. A system according to claim 1 which is incorporated as an anti-DDOS solution in a server.

16. A system according to claim 1 which is incorporated as a library/component in an SDK.

17. A method for efficiently thwarting syn flood DDOS attacks, the method comprising:
providing, in a network controller, hardware having packet a steering capability;
providing a software application to create and to configure initial steering object/s which define a packet steering configuration of the network controller and monitor all opened connections, including updating the packet steering configuration each time a connection is established; and
thwarting SYN flood DDOS attacks by computing a SYN cookie value used for said thwarting, without wasting target server CPU cycles on crypto hash calculation per SYN and ACK packets in real time, thus without devoting per-packet target server CPU effort thereto in real time, including using the steering capability to provide the SYN cookie value, and to sent at least one packet, modified, to the at least one packet's source, rather than resorting to software to perform crypto hash calculation per SYN and ACK packets in real time, wherein the hardware uses said steering capability for redirecting said at least one packet to a different location by modifying said at least one packet, and wherein said modifying comprises swapping said at least one packet's source and destination addresses.

* * * * *